US012358716B2

(12) United States Patent
Andre

(10) Patent No.: US 12,358,716 B2
(45) Date of Patent: Jul. 15, 2025

(54) REINFORCED WASTE COLLECTION DEVICE

(71) Applicant: Fabrice Andre, Cannes (FR)

(72) Inventor: Fabrice Andre, Cannes (FR)

( * ) Notice: Subject to any disclaimer, the term of this patent is extended or adjusted under 35 U.S.C. 154(b) by 1 day.

(21) Appl. No.: 18/263,949

(22) PCT Filed: Feb. 3, 2022

(86) PCT No.: PCT/EP2022/052598
§ 371 (c)(1),
(2) Date: Aug. 2, 2023

(87) PCT Pub. No.: WO2022/167532
PCT Pub. Date: Aug. 11, 2022

(65) Prior Publication Data

US 2024/0116703 A1 Apr. 11, 2024

(30) Foreign Application Priority Data

Feb. 5, 2021 (FR) .................................. FR2101146

(51) Int. Cl.
*B65F 1/16* (2006.01)

(52) U.S. Cl.
CPC .................................. *B65F 1/1623* (2013.01)

(58) Field of Classification Search
CPC ........................ B65F 1/00–1623; B65D 43/16
See application file for complete search history.

(56) References Cited

U.S. PATENT DOCUMENTS

| | | | | |
|---|---|---|---|---|
| 7,922,029 | B1 | 4/2011 | Aretz | |
| 9,694,973 | B2 * | 7/2017 | Ullrich | B65F 1/141 |
| 2011/0297017 | A1 * | 12/2011 | Brown | B30B 9/3053 100/215 |
| 2014/0121090 | A1 * | 5/2014 | Lin | B65F 1/062 493/189 |
| 2014/0246439 | A1 * | 9/2014 | Friedman | B65F 1/06 220/495.11 |
| 2015/0368041 | A1 | 12/2015 | Coffin | |

FOREIGN PATENT DOCUMENTS

| | | |
|---|---|---|
| CN | 2347895 | 11/1999 |
| CN | 202147887 | 2/2012 |
| CN | 106829125 | 6/2017 |
| CN | 109436531 | 3/2019 |
| CN | 209441840 | 9/2019 |
| EP | 1172307 | 1/2002 |
| JP | 3107300 | 11/2000 |
| WO | WO02076842 | 10/2002 |

* cited by examiner

*Primary Examiner* — Kareen K Thomas
(74) *Attorney, Agent, or Firm* — Defillo & Associates, Inc.; Evelyn A. Defillo

(57) ABSTRACT

A waste collection device having a main body delimiting an internal collection volume, a movable door covering a side opening, a stiffening device for stiffening the main body that are configured to prevent the main body from twisting when the door is in the open position.

8 Claims, 8 Drawing Sheets

REINFORCED WASTE COLLECTION DEVICE

CROSS REFERENCE TO RELATED APPLICATION

This application is a national stage entry of PCT/EP2022/052598 filed Feb. 3, 2022, under the International Convention and claiming priority over French Patent Application No. FR2101146 filed Feb. 5, 2021.

FIELD OF THE INVENTION

The invention relates to the field of collection of household and food waste and more precisely the devices provided for this purpose (also called waste bins) for use by private individuals and professionals.

BACKGROUND OF THE INVENTION

Virtually all households are now equipped with one or more waste bins to collect their household and food waste. These waste bins generally comprise a tank defining a collection volume, into which a bin bag is placed, and a removable lid to close the waste bin when its use is not required. The disadvantages of these existing waste bins are that it is complicated to install the bin bag, guarantee good resistance during the repeated uses of the waste bin and, in particular, take out from the collection volume the bin bag when it is full. It is also very complicated to clean the inside of the tank.

To attempt to overcome these disadvantages, waste bins with a door in one of the walls of the tank have been proposed. Such devices make it easier in fact to access the waste collection volume and therefore the bin bag. The latter can thus be removed more easily than with the previous devices. However, they have the disadvantage of being fragile and offering poor resistance over time, when the side door is opened to access the collection volume. The tank, in fact, generally tends to deform when opening the door, which weakens the entire mechanical structure of the tank. The waste bin therefore quickly becomes unusable. Deformation of the tank makes the waste bin unstable, in fact, and it is likely to tip over and fall down. It may also become impossible to close the side door hermetically, thereby allowing bad smells from the collected waste to escape.

SUMMARY OF THE INVENTION

The invention aims in particular to overcome all the above-mentioned disadvantages by proposing a waste collection device in which the bin bag can be installed and removed easily while guaranteeing a rigid tank which is not likely to deform, in particular when the door is in the open position.

The invention therefore relates to a waste collection device wherein it comprises:

a main body delimiting an internal collection volume, the main body extending vertically from a lower part to an upper part, at least one side opening in the main body, at least one door that can be moved between a closed position in which it covers the side opening and an open position in which it allows access to the internal collection volume, means for stiffening the main body that are configured to prevent the main body from twisting when the door is in the open position.

Thus, the waste collection device according to the invention has a main body (that forms at least partially the tank of the waste collection device) having improved rigidity due to the stiffening means, such that any twisting of the main body is prevented when the door is in the open position. Consequently, the device according to the invention withstands over time repeated opening and closing of the side door while offering the advantage of allowing easy access to the waste collection volume thereby making it simpler to install the bin bag in the storage space and remove it.

The means for stiffening the main body strengthen it structurally so that it does not deform when the side door is opened, without however making the waste collection device substantially heavier. It therefore remains easy to handle by the user.

To increase the stiffness of the main body, the latter comprises at least one shoulder blocked by the stiffening means. Such a shoulder can be located around all or part of the main body and its blocking by the stiffening means prevents any relative movement of the main body. Consequently, blocking the shoulder helps to improve the overall rigidity of the main body, including when the side door is in the open position.

To improve the rigidity of the main body even further, the stiffening means comprise means for clamping the main body.

To improve the clamping of the main body, the clamping means comprise a support member and a clamping member, the main body being clamped between the support member and the clamping member. With two separate members, it is thus possible to achieve clamping that is more efficient and easier to implement when assembling the waste collection device.

Still with the objective of improving the clamping of the main body and preventing any risk of it deforming, the support member has a bearing surface for the shoulder, the clamping member covering the shoulder and compressing it against the bearing surface of the support member.

Advantageously, the support member, the main body and the clamping member are firmly attached to each other. Any technique known by those skilled in the art can be considered to firmly attach these items to each other. These three items are thus firmly attached such that the clamping member compresses the main body (including the shoulder of said main body) against the support member, thus ensuring that it is impossible for the main body to twist. There is therefore no risk of the waste collection device deforming over time, even when the side door is opened and closed frequently.

To prevent any damage of the device caused by frequent use, the support member and/or the clamping member are ribbed so as to absorb the forces to which the main body is subjected. The ribs present on the support member and/or the clamping member can in fact be in contact with the part of the main body that is compressed between the support member and the clamping member, thereby distributing the forces to which this portion of the main body is subjected throughout the stiffening means.

To improve the positioning between the support member and the clamping member in order to clamp the main body, the support member comprises at least one male member or one female member and the clamping member comprises at least one female member or one male member intended to be assembled respectively with the male member or the female member of the support member.

Advantageously, the clamping means are configured to clamp the lower part of the main body and/or the upper part of the main body. Consequently, the main body can be stiffened in one or more specific areas in order to prevent any deformation.

To improve even further the overall rigidity of the waste collection device according to the invention, the stiffening means comprise side reinforcements adapted to mechanically reinforce the areas of the main body to which they are attached.

BRIEF DESCRIPTION OF THE DRAWINGS

The invention will be better understood on reading the following description, given solely by way of example and with reference to the accompanying drawings in which.

DETAILED DESCRIPTION

Figure 1:
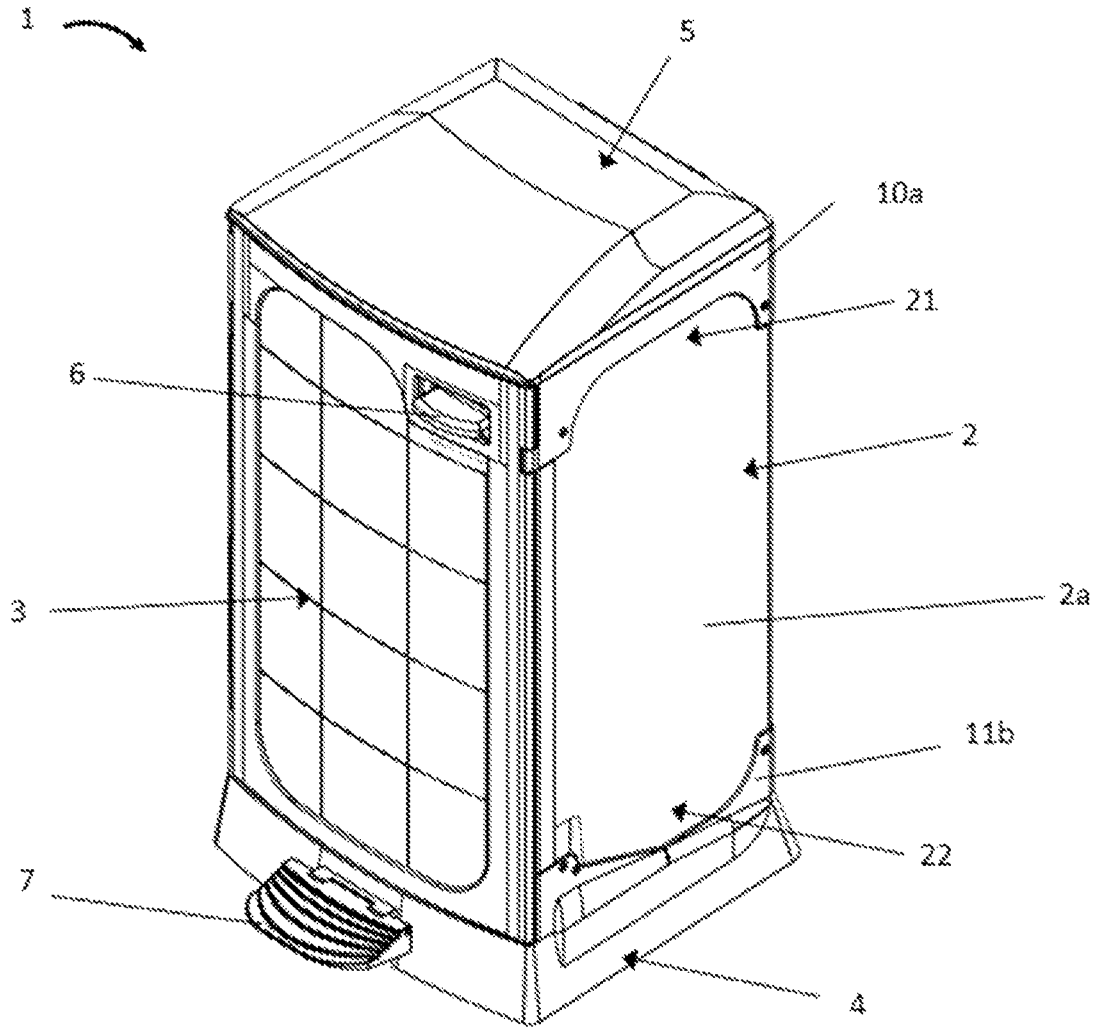
FIG. 1 is a perspective view showing a waste collection device according to one embodiment of the invention.
Figure 2:
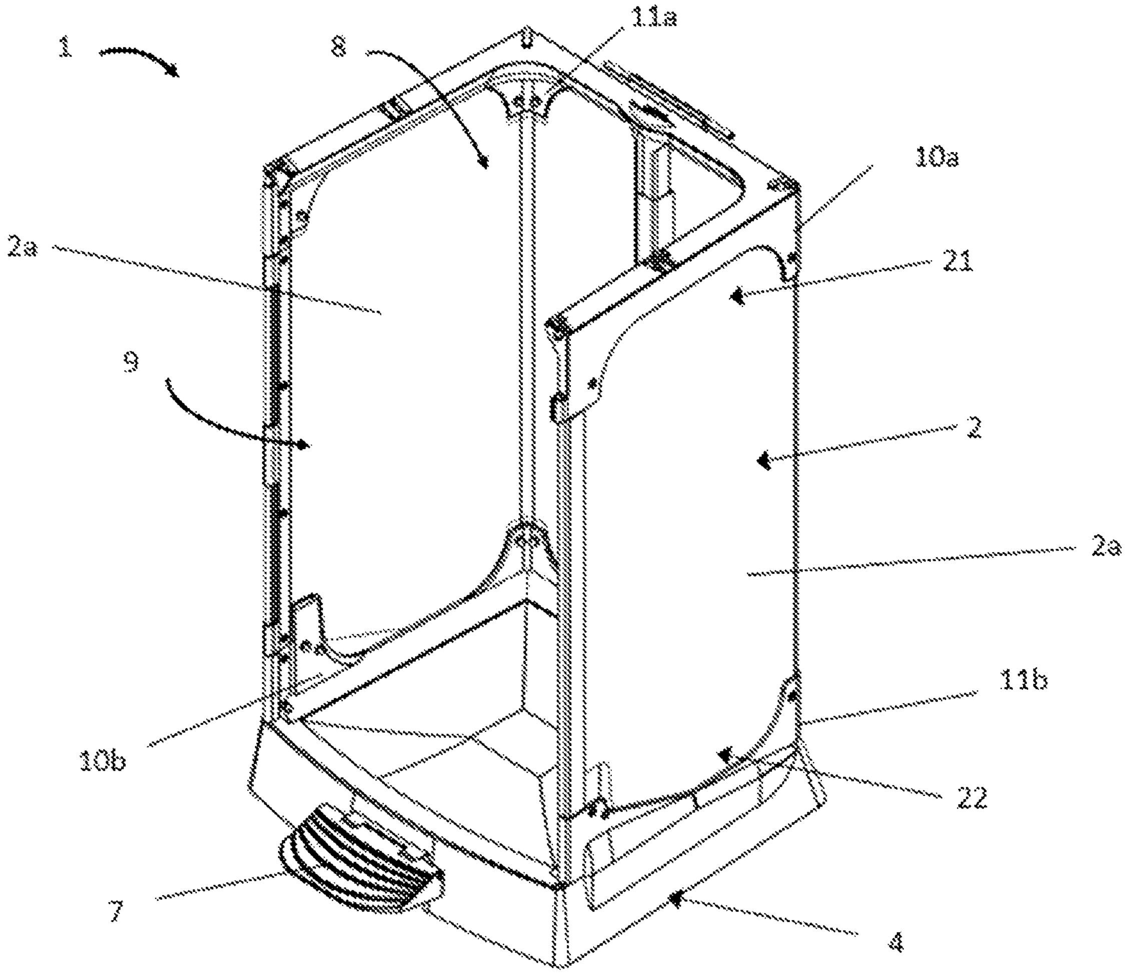
FIG. 2 is a perspective view partially showing the waste collection device of FIG. 1.

FIGS. 1 to 8 show a waste collection device (or only some of its component elements), designated by the general reference 1.

The waste collection device 1 comprises a main body 2 delimiting an internal collection volume 8, the main body 2 extending vertically from a lower part 22 to an upper part 23, at least one side opening 9 in the main body 2, at least one door 3 that can be moved between a closed position in which it covers the side opening 9 and an open position in which it allows access to the internal collection volume 8, means (10*a*, 10*b*, 11*a*, 11*b*, 15) for stiffening the main body 2 that are configured to prevent the main body 2 from twisting when the door 3 is in the open position.

The main body 2 of the device 1 is made of stainless steel but can be made of any material that is thin, light and offers resistance over time. It consists of three flanks 2*a* (shown in particular on FIGS. 2 and 7) which, in combination with the door 3 in the closed position, delimit the internal collection volume 8 in order to collect the household and food waste. To do this, a bin bag (not shown on the figures) is installed inside the internal collection volume 8. Thus, the user wanting to throw waste into the bin bag presses the pedal 7, which pivots the lid 5 thereby allowing the user to access the internal collection volume 8 via the top of the device 1.

When the user wants to replace the bin bag, they operate the handle 6 of the door 3, which separates the door 3 from the base 4 of the device 1. The door then becomes movable in rotation and moves to an open position where it no longer fully covers the side opening 9. The user therefore accesses, via the side opening 9, the bin bag to be replaced and can thus remove it easily.

To prevent the main body 2 from deforming when the door changes from the closed position to the open position, the device 1 comprises stiffening means (10*a*, 10*b*, 11*a*, 11*b*, 15), structurally reinforcing several targeted areas of the main body. The stiffening means (10*a*, 10*b*, 11*a*, 11*b*, 15) of the device 1 according to the embodiment shown comprise means (10*a*, 11*a*) for clamping the upper part 21 of the main body 2 and means (10*b*, 11*b*) for clamping the lower part 22 of the main body 2. Thus, the main body 2 is blocked in its upper part 21 and in its lower part 22, thereby improving its overall rigidity and preventing it from deforming. It therefore remains rigid even when the side door 3 is in the open position. One embodiment of the invention that could be considered and is not shown is one where the stiffening means comprise only means for clamping the lower part or the upper part of the main body. Such a variant could be considered for example, when the height of the waste collection device is relatively small.

The means (10*a*, 11*a*) for clamping the upper part 21 of the main body 2 comprise more precisely a support member 11*a* and a clamping member 10*a* which compresses the upper part 21 of the main body 2 against the support member 11*a*. These two elements perform the compression around the entire periphery of the upper part 21 which distributes the applied forces more effectively. In other words, the clamping member 10*a* and the support member 11*a* both have a shape that is complementary to that of the upper part 21 of the main body, to be able to grip this upper part around its entire periphery.

Figure 3:
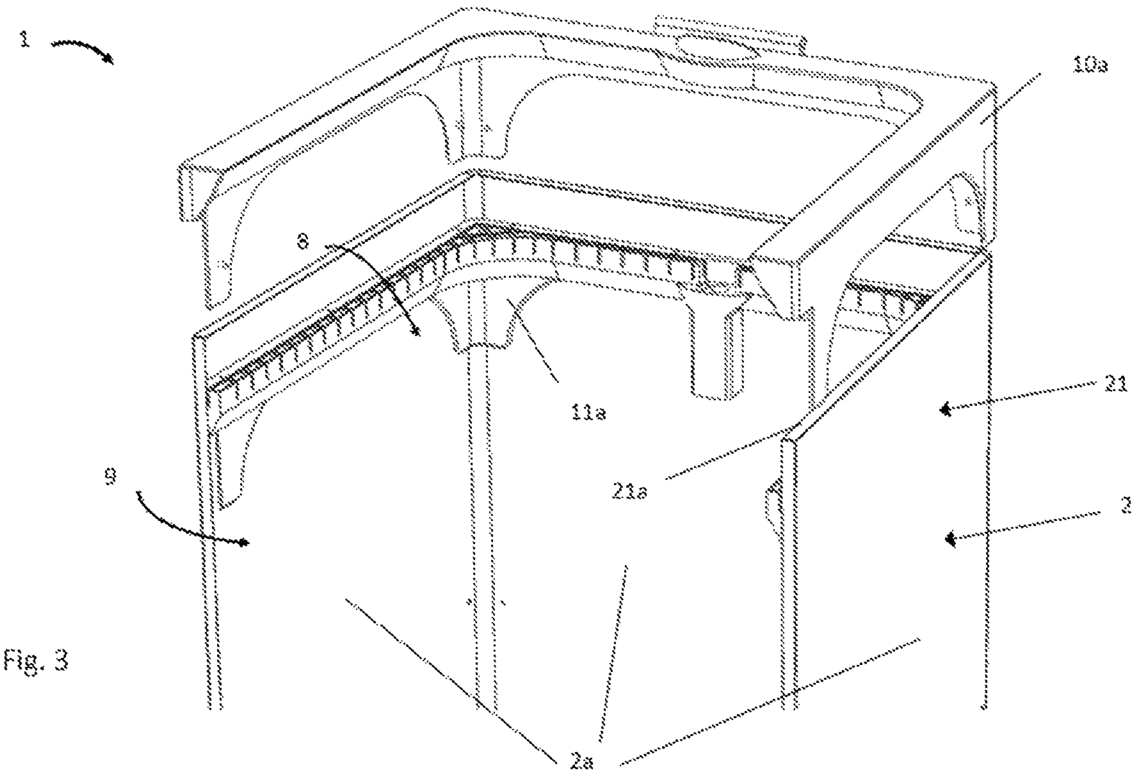
FIG. 3 is an exploded perspective view showing the upper part of the device of FIG. 2.
Figure 5:
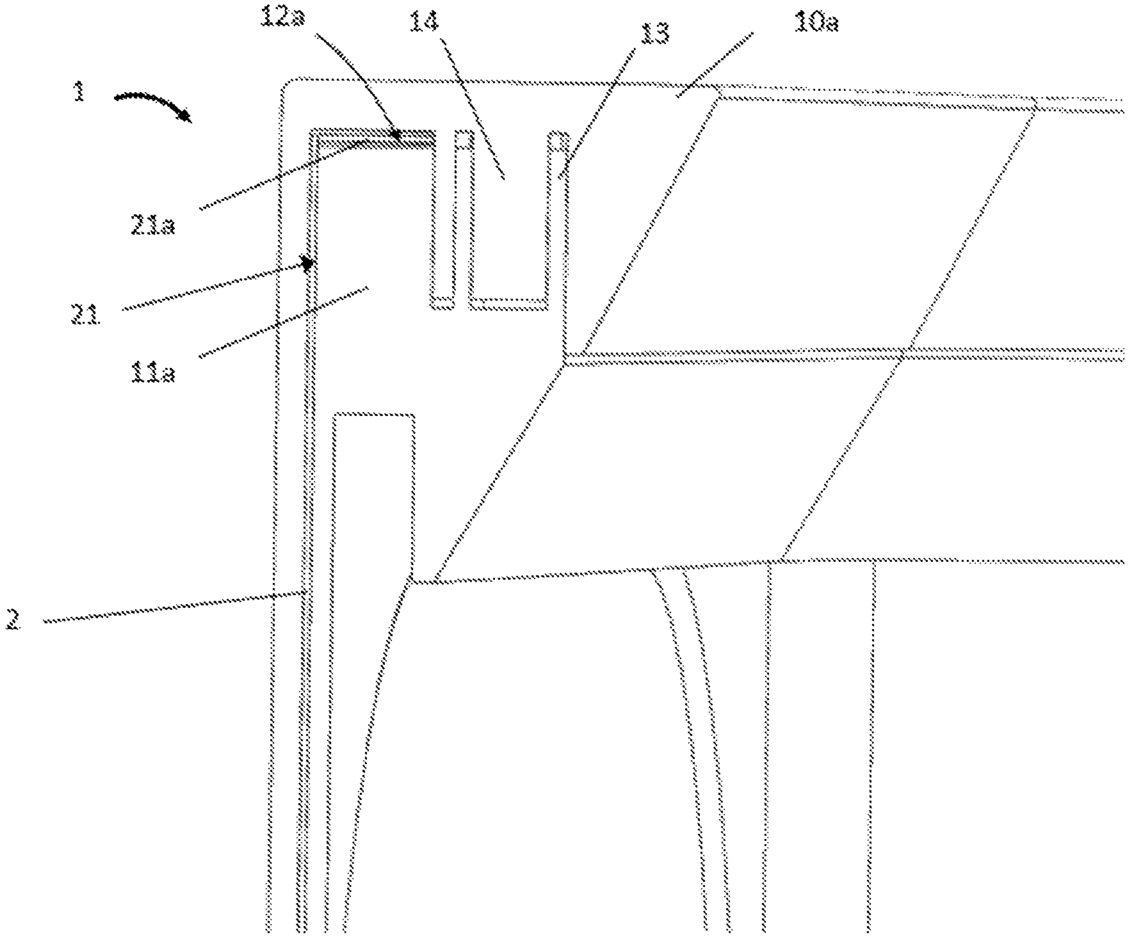
FIG. 5 is a cross-sectional view of the upper part of the device of FIG. 2.

The upper part 21 of the main body 2 further comprises a shoulder 21*a* extending around its entire periphery (FIG. 3). This shoulder 21*a* enables the clamping means (10*a*, 11*a*) to exert an additional compression on the upper part 21, this compression having a vertical direction which differs from the horizontal compression exerted by the clamping means (10*a*, 11*a*) on the rest of the upper part 21 of the main body 2. To do this, the support member 11*a* comprises a bearing surface 12*a* on which the shoulder 21*a* is compressed by the clamping means 10*a* (FIG. 5). This double compression, in two different directions, of the upper part 21 of the main body 2 is implemented when assembling the waste collection device 1. In fact, the support member 11*a*, the upper part 21 of the main body 2 and the clamping member 10*a* are securely attached to each other during assembly by several screwing operations. Obviously, any other technique known by those skilled in the art which guarantees a secure and strong attachment can be used (for example, bonding or clipping).

Figure 4:
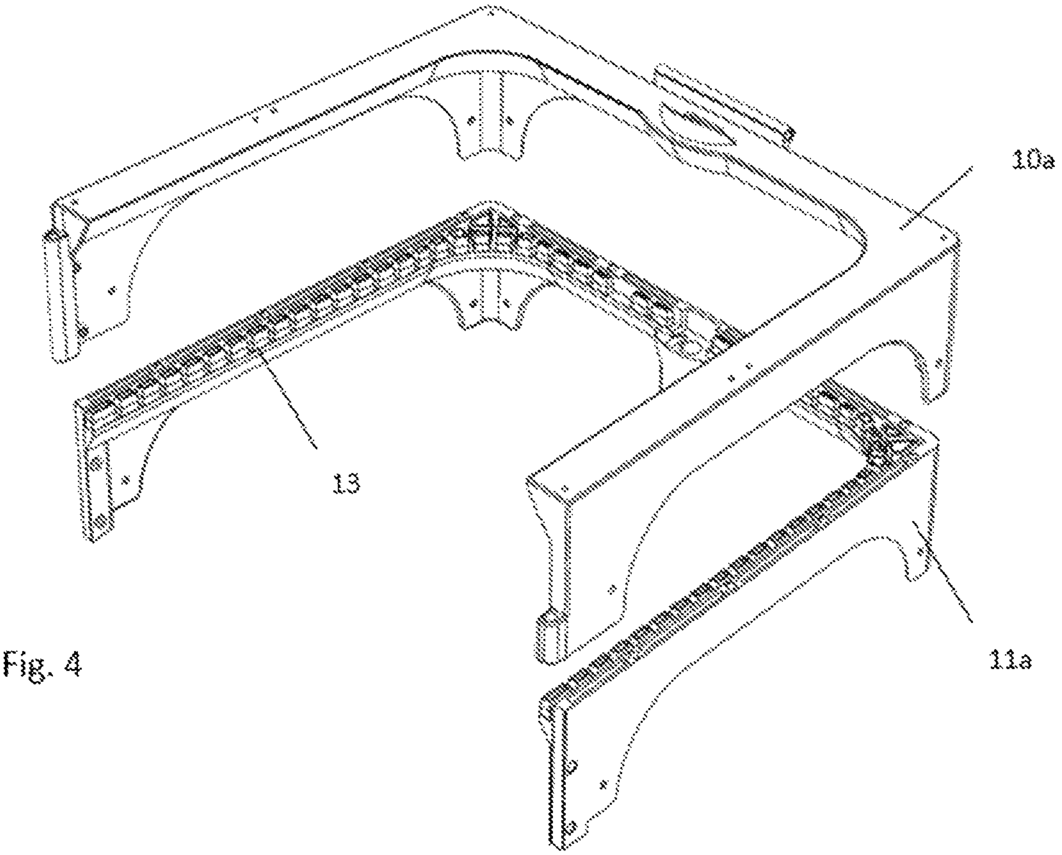
FIG. 4 is a perspective view showing the means for clamping the upper part of the main body of the device according to the invention.

To easily position the clamping member 10*a* and the support member 11*a* ready for the above-mentioned attachment, the support member 11*a* comprises a plurality of male members 13, which correspond to protrusions projecting from the support member 11*a* (FIGS. 4 and 5). These male members are each intended to be housed in one of the female members 14 of the clamping member 10*a*, which correspond to housings whose shape matches that of the protrusion which it is intended to accommodate. Thus, the correct positioning of these two parts is simplified and the possibilities of moving one part relative to the other are reduced after they have been assembled.

Figure 6:
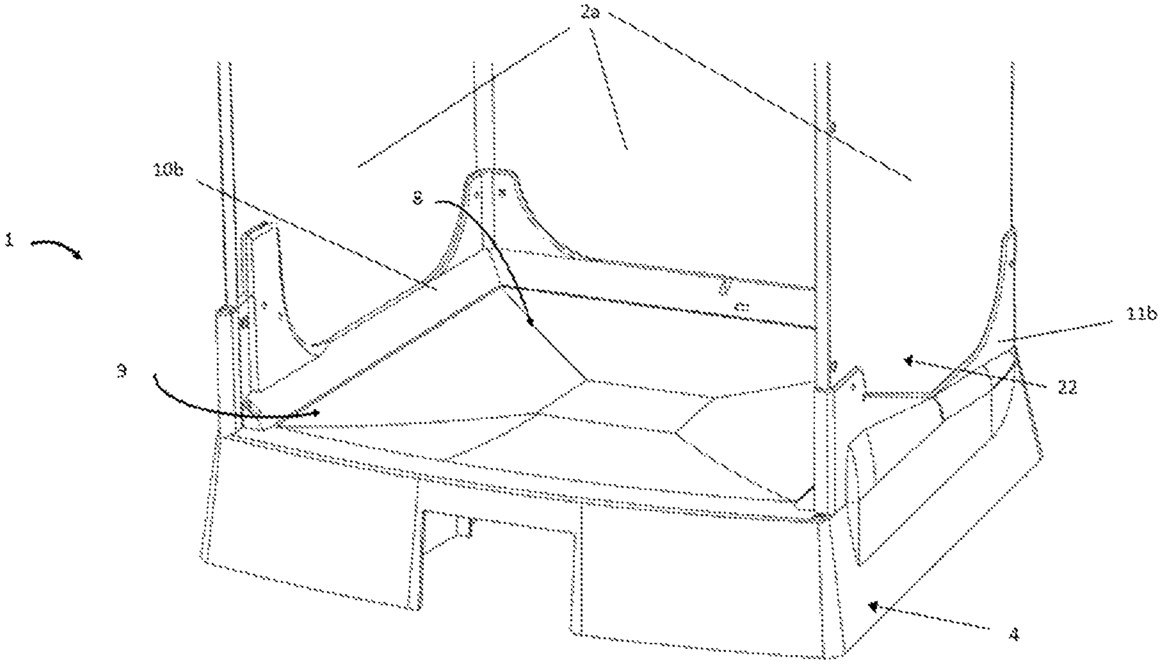
FIG. 6 is a perspective view showing the lower part of the device according to the invention.
Figure 7:
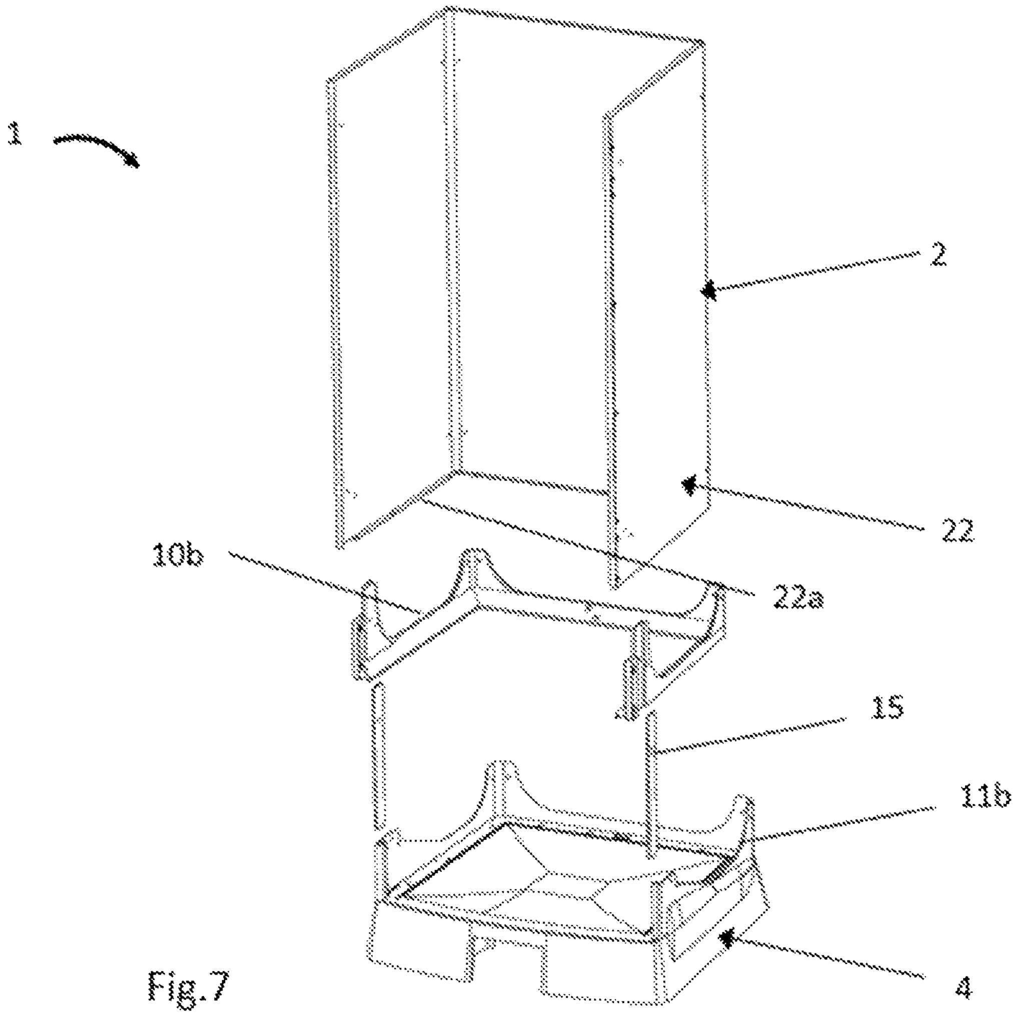
FIG. 7 is an exploded perspective view showing the lower part of the device according to the invention.
Figure 8:
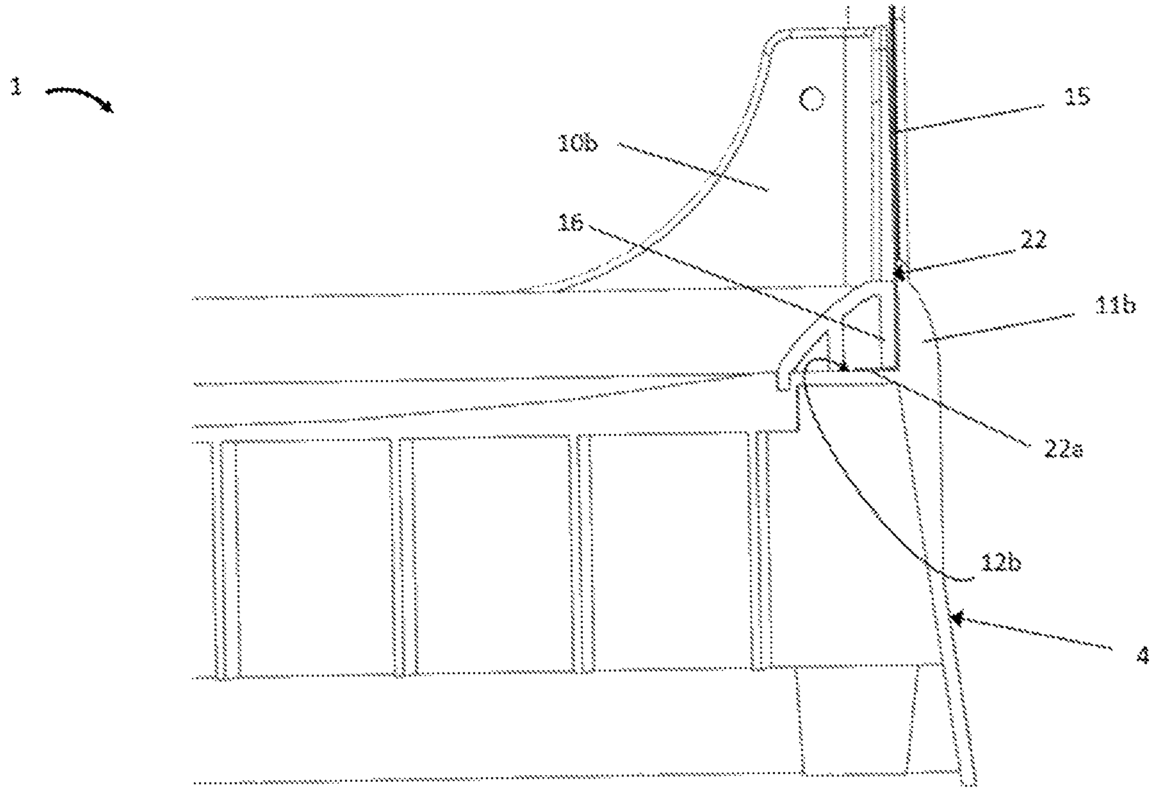
FIG. 8 is a cross-sectional view of the lower part of the device according to the invention.

The means (10*b*, 11*b*) for clamping the lower part 22 of the main body 2 comprise more precisely a support member 11*b* and a clamping member 10*b* which compresses the lower part 22 of the main body 2 against the support member 11*b*. These two elements perform the compression over the entire periphery of the lower part 22. In other words, the clamping member 10*b* and the support member 11*b* both have a shape that is complementary to that of the lower part 22 of the main body in order to be able to grip the lower part around its entire periphery (FIGS. 6 and 7). The support member 11*b* is attached to the rest of the base 4 of the device 1, which simplifies the design of the device 1 and reduces the time required for its assembly.

The lower part 22 of the main body 2 further comprises a shoulder 22*a* extending around its entire periphery (FIG. 7). This shoulder 22*a* enables the clamping means (10*b*, 11*b*) to exert an additional compression on the lower part 22, this compression having a vertical direction which differs from the horizontal compression exerted by the clamping means (10*b*, 11*b*) on the rest of the lower part 22 of the main body 2. To do this, the support member 11*b* comprises a bearing surface 12*b* on which the shoulder 22*a* is compressed by the clamping means 10*b* (FIG. 5). This double compression, in two different directions, of the lower part 22 of the main body 2 is implemented when assembling the waste collection device 1. In fact, the support member 11*b*, the lower part 22 of the main body 2 and the clamping member 10*b* are securely attached to each other during assembly by several screwing operations. Once again, any other known assembly technique can be considered.

To absorb and distribute within the device 1 the forces to which the lower part 22 of the main body 2 is subjected (in particular the forces to which it is subjected when opening the door 3), the clamping member 10*b* comprises ribs 16 in direct contact with the lower part 22 of the main body 2.

In addition, and to further reinforce the structure of the device 1 in the lower part 22, side reinforcements 15 extending vertically are provided on each side of the side opening 9.

In the embodiment shown on FIGS. 1 to 8, the side opening 9 represents the entire surface separating two opposite flanks of the main body, thereby giving it a U-shape. In variants of the invention not shown, this opening may represent only a portion of this surface. Consequently, the shape of the main body is different from the U-shape of the embodiment illustrated and comprises a fourth flank in which the opening is formed.

As indicated in the previous paragraph, the invention is not limited to the embodiments described and other embodiments will be clearly apparent to those skilled in the art.

LIST OF REFERENCES

1: waste collection device
2: main body
2*a*: flank of the main body
3: side door
4: base
5: lid
6: door handle
7: lid opening pedal
8: internal collection volume
9: side opening
10*a*: member for clamping the upper part of the main body
10*b*: member for clamping the lower part of the main body
11*a*: member for supporting the upper part of the main body
10*b*: member for supporting the lower part of the main body
12*a*: bearing surface in the upper part
12*b*: bearing surface in the lower part
13: male member
14: female member
15: side reinforcement
16: ribs of the member for clamping the lower part
21: upper part of the main body
21*a*: shoulder of the upper part of the main body
22: lower part of the main body
22*a*: shoulder of the lower part of the main body

What is claimed is:

1. A waste collection device comprising:
a main body delimiting an internal collection volume, the main body extending vertically from a lower part to an upper part,
at least one side opening in the main body,
at least one door that moves between a closed position in which covers the side opening and an open position in which allows access to the internal collection volume,
a stiffening device for stiffening the main body that are configured to prevent the main body from twisting when the door is in the open position,
wherein the stiffer device comprises a clamping device for clamping the main body,
wherein the clampin device comprises a support member and a clamping member, the main body being clamped between the support member and the clamping member.

2. Thee device according to claim 1, wherein the main body comprises at least one shoulder blocked by the stiffening device.

3. A waste collection device comprising:
a main body delimiting an internal collection volume, the main body extending vertically from a lower part to an upper part,
at least one side opening in the main body,
at least one door that moves between a closed position in which covers the side opening and an open position in which allows access to the internal collection volume,
a stiffening device for stiffening the main body that are configured to prevent the main body from twisting when the door is in the open position,
wherein the stiffening device comprises a clamping device for clamping the main body
wherein the clamping device is configured to clamp the lower part of the main body and/or the upper part of the main body.

4. The device according to claim 1, wherein the support member has a bearing surface for the shoulder, the clamping member covering the shoulder and compressing it against the bearing surface of the support member.

5. The device according to claim 1, wherein the support member, the main body, and the clamping member are securely attached to each other.

6. The device according to claim 1, wherein the support member and/or the clamping member are ribbed so as to absorb the forces to which the main body is subjected.

7. The device according to claim 1, wherein the support member comprises at least one male member or one female member and wherein the clamping member comprises at least one female member or one male member intended to be assembled respectively with the male member or the female member of the support member.

8. The device according to claim 1, wherein the stiffening device comprise side reinforcements adapted to mechanically reinforce the areas of the main body to which they are attached.

* * * * *